United States Patent
Katragadda et al.

(10) Patent No.: US 9,856,779 B2
(45) Date of Patent: Jan. 2, 2018

(54) SYSTEM AND METHODS FOR A HIGH TEMPERATURE RADIATOR HEAT ABSORBER

(71) Applicant: Ford Global Technologies, LLC, Dearborn, MI (US)

(72) Inventors: Sunil Katragadda, Canton, MI (US); Cary Cole, Livonia, MI (US); Michael Levin, Ann Arbor, MI (US); Danrich Henry Demitroff, Okemos, MI (US); Mathew John Fast, Dearborn Heights, MI (US); Furqan Zafar Shaikh, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 300 days.

(21) Appl. No.: 14/677,655

(22) Filed: Apr. 2, 2015

(65) Prior Publication Data
US 2016/0290216 A1    Oct. 6, 2016

(51) Int. Cl.
*F01P 11/16* (2006.01)
*F01P 3/18* (2006.01)
*F01P 7/16* (2006.01)
*F28D 20/02* (2006.01)

(52) U.S. Cl.
CPC .............. *F01P 11/16* (2013.01); *F01P 3/18* (2013.01); *F01P 7/16* (2013.01); *F28D 20/02* (2013.01); *F28D 20/028* (2013.01); *F01P 2003/185* (2013.01); *F01P 2031/16* (2013.01); *Y02E 60/145* (2013.01)

(58) Field of Classification Search
CPC .. F02F 1/425; F02F 1/4242; F02M 35/10262; F01P 11/20; F01P 2011/2025; F01P 2011/205
See application file for complete search history.

(56) References Cited

U.S. PATENT DOCUMENTS

| | | | |
|---|---|---|---|
| 4,131,158 A * | 12/1978 | Abhat | C09K 5/063 126/400 |
| 7,735,461 B2 * | 6/2010 | Vetrovec | F01P 11/20 123/41.01 |
| 8,800,502 B2 | 8/2014 | Choi et al. | |
| 2011/0214629 A1 | 9/2011 | Benoit | |

FOREIGN PATENT DOCUMENTS

CA    2470222 A1    12/2005
WO    2014055783 A1    4/2014

* cited by examiner

*Primary Examiner* — Kevin A Lathers
(74) *Attorney, Agent, or Firm* — Greg Brown; McCoy Russell LLP

(57) ABSTRACT

Methods and systems are provided for a phase change material (PCM) integrated radiator. In one example, a method may include adjusting a radiator control valve into a first position to flow coolant only through a first zone of a radiator containing phase change material (PCM) and not through a second zone of the radiator not containing phase change material. The method may further include adjusting the radiator control valve into a second position to flow coolant only through the second zone of the radiator and not the first zone.

20 Claims, 4 Drawing Sheets

SYSTEM AND METHODS FOR A HIGH TEMPERATURE RADIATOR HEAT ABSORBER

FIELD

The present description relates generally to methods and systems for regulating the temperature of fluid in an engine cooling system.

BACKGROUND/SUMMARY

Vehicle cooling systems provide a vehicle engine with coolant to cool the engine. Coolant may be circulated through the cooling system by a water pump. The coolant may flow from the water pump to the engine, and as the coolant passes through the engine, it absorbs heat from the engine. Heated coolant then flows to a radiator in the cooling system to be cooled before returning again to the engine. Traditional radiators may comprise a fan which blows air through the radiator and cools the coolant passing through the radiator. Specifically, the radiator may include a plurality of tubes for flowing coolant therethrough and heat conductive fins to increase heat transfer from the coolant in the tubes to ambient air. However, the effectiveness of the radiator in cooling the coolant may be decreased under certain operating conditions, such as when the ambient air temperature is above a threshold. Moreover, if the temperature of the coolant reaches the boiling point of the coolant, coolant may be vaporized and lost from the cooling system and the effectiveness of the coolant in cooling the engine may be decreased, which may, in turn, lead to engine degradation.

Previous attempts to address the vaporization of coolant include utilizing phase change material (PCM) to absorb excess heat from the coolant. PCM is used as a heat absorber because of its high latent heat of fusion. When a solid material reaches its melting point, energy can be added to the material, without increasing the temperature of the material. This is because energy is required to change the phase of a material from solid to liquid. The amount of energy required to melt a material without changing its temperature may be referred to as its latent heat of fusion. Because of PCM's large latent heat of fusion, it is able to absorb a significant amount of heat while maintaining its temperature. Thus, incorporating PCM into a cooling system may increase the efficiency of the cooling system.

One example approach to employ the use of PCM in a cooling system to reduce excessive coolant temperatures is shown in U.S. Pat. No. 7,735,461, which provides an auxiliary line downstream of a radiator, the auxiliary line containing PCM capsules. Coolant may be directed through the auxiliary line containing the PCM capsules if the coolant temperature increases above a threshold, where the threshold may be the melting temperature of the PCM. Because the coolant is at a higher temperature than the PCM, the PCM may naturally draw heat from the coolant, raising the temperature of the PCM. However, when the PCM reaches its melting point, because of the PCM's high latent heat of fusion, it may continue to draw heat from the coolant without its own temperature being raised. Therefore, the PCM provides increased cooling over other materials with lower latent heats of fusion. As such, the system provided in U.S. Pat. No. 7,735,461, may divert coolant flow through the auxiliary line containing PCM, to increase coolant cooling efficiency at high coolant temperatures.

However, the inventors herein have recognized potential issues with such systems. Adding an auxiliary line containing PCM to a cooling system increases the amount of piping and number of valves in the cooling system. Thus, the cost, packaging size, and complexity of such cooling systems may be increased. Further, due to the additional plumbing required by such systems, the chances of leakages, and malfunctions in such systems are increased.

Thus, the inventors herein have provided a system and methods for addressing the issues described above. In one example, the issues described above may be addressed by a method comprising, adjusting a radiator control valve into a first position to flow coolant only through a first zone of a radiator containing phase change material (PCM) and not through a second zone of the radiator not containing phase change material, and adjusting the radiator control valve into a second position to flow coolant only through the second zone of the radiator and not the first zone. In this way, the efficiency of a radiator may be increased, while both its size and power consumption may be decreased. As such, the fuel efficiency of an engine may be increased.

As one example, the first and second zones may comprise hollow tubes for flowing coolant therethrough. The second zone may comprise heat conductive fins for increasing heat dissipation from coolant flowing through the second zone. However, the tubes in the first zone may instead be encased in PCM. As such, the thermal absorption efficiency of the first zone may be greater than the second zone at coolant temperatures above the melting temperature of the PCM. Thus, for coolant temperature above the threshold, the radiator control valve may be adjusted to a first position to flow coolant through the first zone of the radiator. For coolant temperatures below the threshold, the radiator control valve may be adjusted to a second position to flow coolant through the second zone of the radiator. Thus, by flowing coolant through the first zone of the radiator containing PCM when coolant temperatures exceed a threshold, the coolant may be cooled more effectively, and thus, the amount of coolant lost to vaporization may be reduced. Furthermore, by incorporating the PCM within the radiator and regulating coolant flow within the radiator with the control valve, the overall compactness and efficiency of the cooling system may be increased, while the cost and size may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
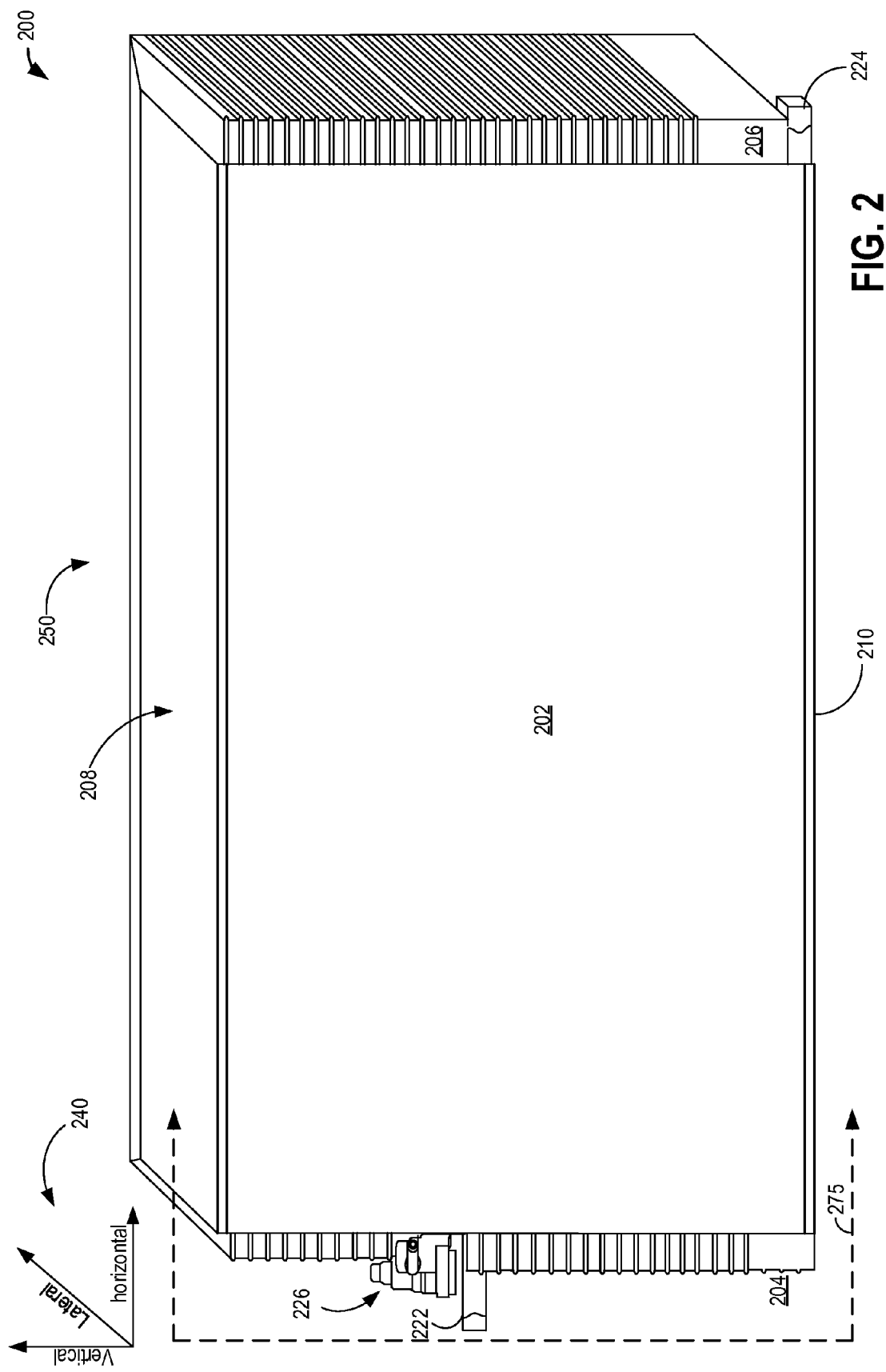
FIG. 2 is a side perspective view of an example radiator.
Figure 3:
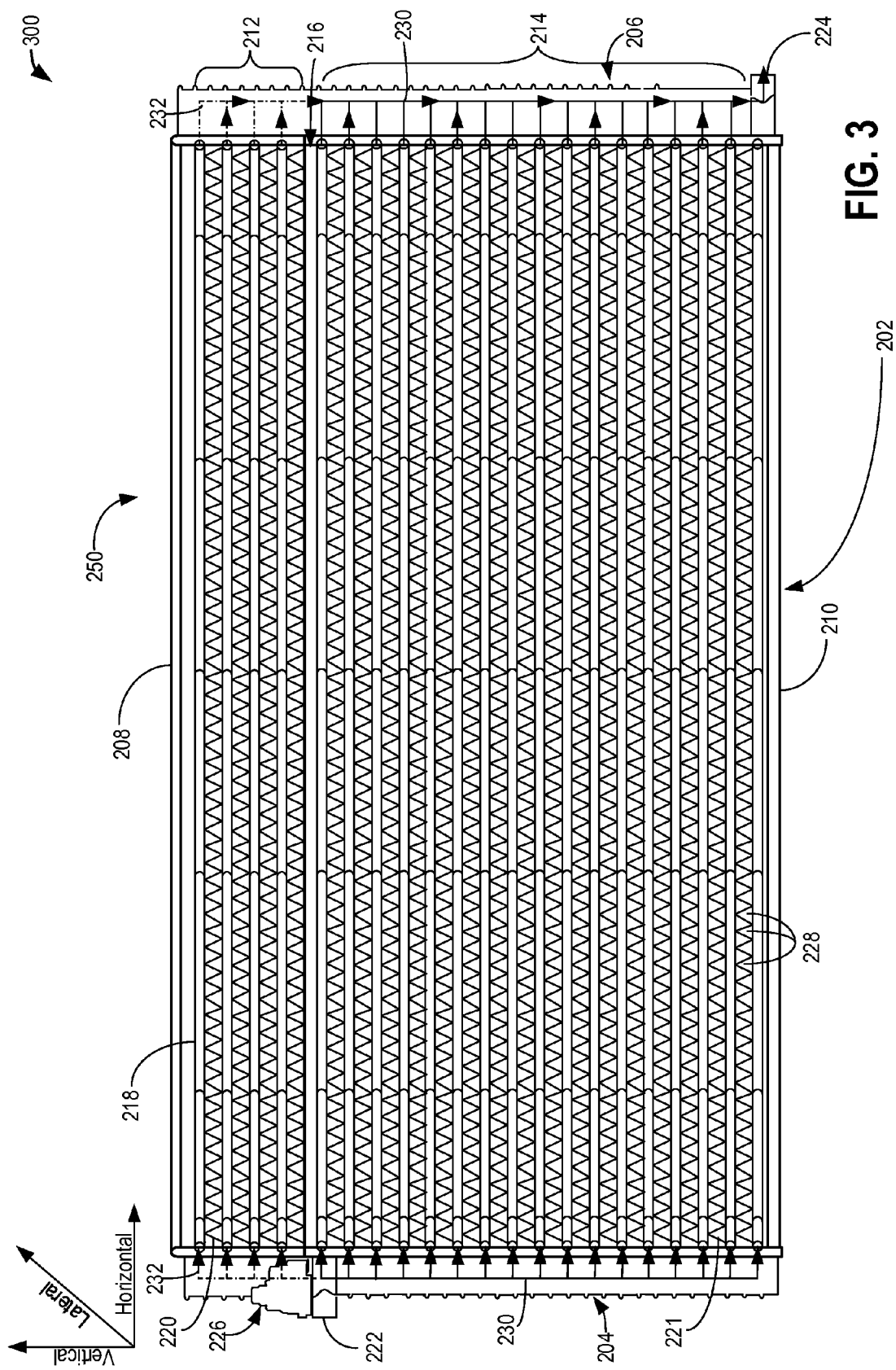
FIG. 3 is a cross-sectional view of the example radiator of FIG. 2.

The following description relates to systems and methods for regulating a flow of coolant in a cooling system. In a cooling system, such as the cooling system shown in FIG. 1, coolant may be circulated through the cooling system, between an engine and a radiator by a pump. The coolant may be directed through the engine to absorb heat from the engine, thereby cooling the engine. Heated coolant may then flow to a radiator in the cooling system to be cooled before returning again to the engine. A radiator, such as the radiator shown in FIGS. 2 and 3, may include a plurality of tubes through which coolant flows as the coolant passes through the radiator. However, the effectiveness of radiator in cooling the coolant may be decreased under certain operating conditions, such as when the ambient air temperature is above a threshold. In such conditions, the heat transfer from the coolant to the ambient air may be reduced. In order to increase the efficiency of the radiator and/or decrease the size of the radiator, the radiator may be integrated with a plurality of PCM containing fins. For example, as shown in FIGS. 2 and 3, a radiator may comprise two distinct zones: a first zone containing the PCM, and a second zone comprising the traditional heat conductive fins described above. Further, a radiator control valve may be coupled in a passage in fluidic communication with both the first and second zones. By adjusting a position of the control valve, a flow of coolant to the first and second zones may be adjusted. As one example, the flow of coolant to the first and second zones may be adjusted based on the coolant temperature, as described at FIG. 4. During peak engine load conditions, such as during hill-climbing and trailer towing, coolant temperatures may increase. In one example, if the coolant temperature increases above a higher first threshold, coolant is directed to the first zone of the radiator. Due to the high melting temperature and latent heat of fusion of the PCM, the first zone may be more effective at removing heat from the coolant than the second zone when the coolant temperature increases above the first threshold. Further, energy stored in the PCM may be returned to the coolant when the coolant temperature drops below a lower, second threshold. In this way, the cooling efficiency of the radiator may be improved, and the packaging size and power consumption of the radiator may be decreased.

Figure 1:
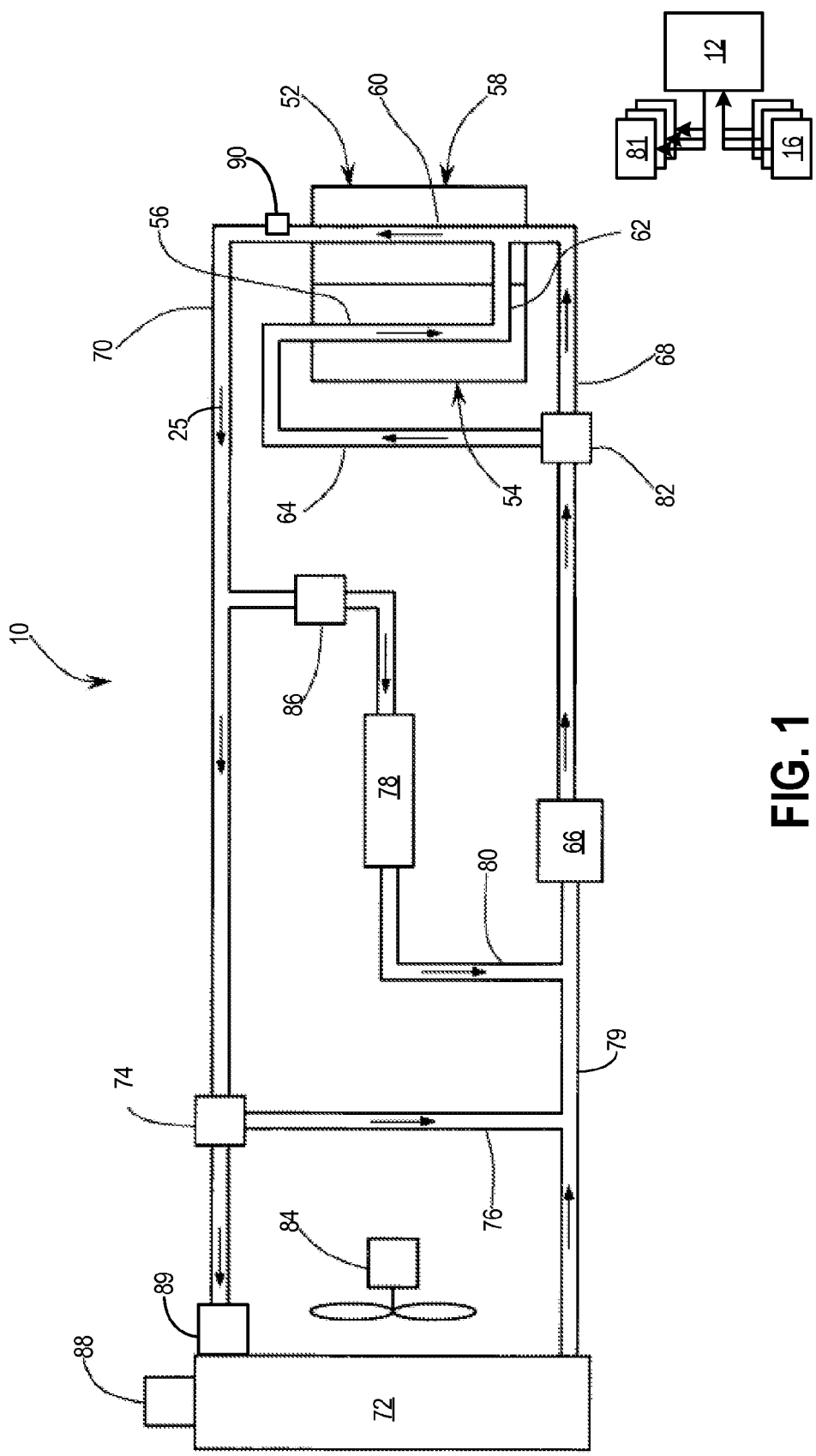
FIG. 1 is a schematic diagram of an example engine cooling system.

Referring to FIG. 1, it shows an example cooling system for an internal combustion engine. Cooling system 10 comprises an engine 52, radiator 72, pump 66 (e.g., water pump or coolant pump), and interconnecting lines. Components of the cooling system 10 shown connected to one another are fluidly connected so that the pump 66 may circulate coolant fluid between the engine 52 and the radiator 72. In the description provided herein, the coolant fluid may also be referred to as "coolant" and/or "liquid coolant." Direction of coolant flow is indicated by flow arrows 25. Further, the flow of coolant in the cooling system 10 may be controlled by controller 12.

The engine 52 further comprises a cylinder block 54 and a cylinder head 58 mounted on the cylinder block. In one example the engine 52 may be a gasoline engine, where the engine 52 may be powered by gasoline fuel. However, in other examples, the engine 52 may be a diesel engine, that may be powered by diesel fuel. The cylinder block 54 has a first cooling jacket 56 and the cylinder head 58 has a second cooling jacket 60. The first and second cooling jackets 56 and 60, respectively, are fluidly connected by an internal passage 62 between the head 58 and the block 54. A first coolant inlet line 64 fluidly connects with the first and second cooling jackets 56 of the block 54 to receive coolant from the pump 66. In some examples, a second coolant inlet line 68 may be included in the cooling system 10 and may be fluidly connected with the cooling second jacket 60 of the head 58 to receive coolant from the pump 66. However, in other examples, second coolant inlet line 68 may not be included in cooling system 10, and as such, coolant may only flow to the cylinder head 58 from the cylinder block 54 and first coolant inlet line 64.

The pump 66, which in some examples may be a water or coolant pump, and may herein also be referred to as water pump 66), may be of any suitable type including a centrifugal type and/or vane type. In one example the water pump 66 may be driven by the engine 52. In another example, the water pump 66 may be driven by its own motor which may be one or more of a hydraulic, pneumatic, and electric motor. The water pump 66 may be in electrical communication with controller 12. Controller 12 may send electrical signals to water pump 66 to regulate the amount of coolant being pumped through cooling system 10. Specifically, the controller 12 may send signals to the electric motor of the water pump 66, to adjust the power and/or speed output by the motor. The water pump drive may be a variable speed drive arranged so that the pump output flow rate may be varied to meet coolant flow demand over a desirable range. In another embodiment, the water pump 66 may use variable pitch vanes or an engine bypass line to vary coolant flow through the engine 52. Coolant may be pumped by the water pump 66 to a diverter valve 82 en route to the engine 52.

The diverter valve 82 may be disposed between the coolant pump 66 and the coolant inlet lines 64 and 68 of the engine 52. The diverter valve 82 may include an actuator for adjusting the position of the valve. In one example the actuator may be an electric motor. In other examples, the actuator may be any other suitable actuator, such as pneumatic, or hydraulic. Controller 12, may send electrical signals to the actuator for adjusting the position of the diverter valve 82. Said another way, the actuator may adjust the position of the diverter valve 82 based on electrical signals received from the controller 12. The diverter valve 82 is adapted to selectively regulate the amount of coolant flow circulated through the block 54 and the head 58. In particular, the diverter valve 82 may direct full coolant flow to the first coolant inlet 64 for passage through both the block 54 and the head 58 in series.

The diverter valve 82 may be adjusted to direct a portion of the coolant flow to the second coolant inlet 68. This coolant bypasses the cylinder block 54 and passes through the cylinder head 58, mixing with the portion of coolant coming from the block 54. This maintains full coolant flow through the head 58 but provides reduced flow through the block 54. The diverter valve 82 allows the water pump 66 to operate at a reduced flow rate by selectively directing flow where the engine 52 needs cooling. Thus, as the amount of coolant pumped through the cooling jackets 56 and 60 decreases, the energy required to drive the water pump 66 decreases and efficiency of the cooling system 10 increases. When the diverter valve 82 reduces the flow of coolant to the block 54 and directs the bypassed flow to the head 58, the head 58 may be operated at a cooler temperature than the block 54, which may be more easily maintained at a desired operating temperature. This allows for increased engine efficiency and reduced emissions. Running the head 58 at a lower temperature than the block 54 also reduces the likelihood of knock, and may allow the engine 52 to operate at a higher compression ratio.

However, in other embodiments, the cooling system 10 may not include diverter valve 82 and second coolant inlet line 68 for diverting a portion of coolant to the cylinder head 58 without first flowing through the block 54. Thus, in some examples, coolant may only flow to the cylinder head 58 after having gone through the cylinder block 54.

Coolant may flow out from the engine 52 along coolant outlet line 70 and may be directed to one or more of a heater bypass line 80 and a temperature control valve 74. Flow of coolant through the heater bypass line 80 may be regulated by a heater control valve 86 positioned in the heater bypass line 80. The heater bypass line 80 may be coupled on one end to the coolant outlet line between the engine 52 and the temperature control valve 74. On the other end, the heater bypass line 80 is coupled to recirculation line 79. In one example, the heater control valve 86, may a thermostatic valve. In another example the position of the heater control valve 86 may be adjusted by an actuator. The actuator may be in communication with the controller 12. As such, the control may send signals to the actuator for adjusting the position of the heater control valve 86 in response to signals from various sensors and commands from a vehicle operator. A heater 78 is positioned in heater bypass line 80, for providing heat to a passenger compartment (not shown). As such, a portion of coolant in cooling system 10 may be directed from the engine 52, through heater bypass line 80 to the water pump 66.

Coolant not flowing through heater bypass line 80, may flow to the temperature control valve 74. The temperature control valve 74 then directs coolant flow either to the radiator 72 or to a radiator bypass line 76 based on the temperature of the coolant. In one embodiment, the temperature control valve 74 may be a thermostatic valve, whereby changes in the coolant temperature may cause a change in the position of the temperature control valve 74. Specifically, the temperature control valve 74 may comprise a fluid or solid that may expand or contact depending on the temperature of the coolant. As an example, the temperature control valve 74 may comprise a wax element. The wax may melt in response to increasing coolant temperatures and as the wax melts it may expand. Expansion of the wax may provide a pressure force which may directly or indirectly actuate the position of the temperature control valve 74. In another embodiment, the valve 74 may be an actuated valve, whereby the position of the valve 74 may be adjusted by an actuator, the actuator being controlled by the controller 12. In one example the actuator may be an electric motor. In other examples, the actuator may be any other suitable actuator, such as pneumatic, or hydraulic. Controller 12, may send electrical signals to the actuator for adjusting the position of the temperature control valve 74, based on feedback from a temperature sensor 90. Temperature sensor 90 may be positioned in coolant outlet line 70 between the engine 52 and the temperature control valve 74, for measuring a temperature of the coolant. Said another way, based on the signals received from the temperature sensor 90 corresponding to the temperature of the coolant in the cooling system 10, the controller 12 may send electrical signals to the actuator of the temperature control valve 74, for adjusting the position of the temperature control valve 74.

The position of the temperature control valve 74 may be adjusted to selectively control the flow of coolant to the radiator 72 and/or radiator bypass line 76. As will be discussed in greater detail with reference to FIG. 3, the position of the temperature control valve 74 may be adjusted based on the temperature of the coolant. As an example, if the temperature of the coolant is below the threshold temperature, the position of the temperature control valve 74 may be adjusted to flow coolant through the radiator bypass line 76, without flowing coolant through the radiator 72. As such, coolant flow may be directed to the water pump 66 via radiator bypass line 76 to reduce overcooling of the engine.

From the temperature control valve 74, coolant may then flow to either the radiator 72 and/or radiator bypass line 76. The coolant that bypasses the radiator 72 flows through the radiator bypass line 76 to the water pump 66 before being recirculated through the cooling system 10. Specifically, the radiator bypass line 76 may be coupled to the temperature control valve 74 at one end and to a recirculation line 79 on the other end. Recirculation line 79 may direct coolant from one or more of the heater bypass line 80, radiator bypass line 65, and radiator 72 to the water pump 66. As such, coolant in cooling system 10 may flow through recirculation line 79 before being pumped back through cooling system 10 by water pump 66.

The radiator 72 is a heat exchanger adapted for removing excess heat from the coolant heated in the engine 52 and transferring such heat to ambient air. The radiator 72 may receive coolant from the coolant outlet line 70 of the engine 52. Coolant discharged from the radiator 72 is conducted back to the water pump 66 to be circulated through the system 10 for cooling the engine 52. A coolant pressure relief valve 88 may be installed in the system 10. In one embodiment, the pressure relief valve 88 may be incorporated in the radiator 72 and may be in closer proximity to the coolant inlet of the radiator 72 than the coolant outlet of the radiator 72. In particular, the pressure relief valve 88 may be an integral part of a radiator fill cap. The pressure relief valve 88 may be open when the pressure in the radiator exceeds a threshold pressure. The threshold pressure may correspond to a coolant temperature, which may be near the coolant boiling point.

The radiator 72 additionally includes a radiator control valve 89. In one embodiment, the radiator control valve 89 may be a thermostatic valve, whereby changes in the coolant temperature may cause a change in the position of the radiator control valve 89. Specifically, the radiator control valve 89 may comprise a fluid or solid that may expand or contract depending on the temperature of the coolant. As an example, the radiator control valve 89 may comprise a wax element. The wax may melt in response to increasing coolant temperatures and as the wax melts it may expand. Expansion of the wax may provide a pressure force which may directly or indirectly actuate the position of the radiator control valve 89. In another embodiment, the radiator control valve 89 may be an actuated valve, whereby the position of the radiator control valve 89 may be adjusted by an actuator, the actuator being controlled by the controller 12. In one example the actuator may be an electric motor. In other examples, the actuator may be any other suitable actuator, such as pneumatic, or hydraulic. Controller 12, may send electrical signals to the actuator for adjusting the position of the radiator control valve 89, based on feedback from the temperature sensor 90. The position of the radiator control valve 89 may be adjusted to regulate the flow of coolant within the radiator 72 as will be described in greater detail below with reference to FIGS. 3 and 4.

Specifically, in order to provide additional cooling for the coolant, a portion of the radiator 72, may include phase change material (PCM) as will be described in greater detail below with reference to FIG. 3. Thus, the radiator may comprise two zones: a first zone comprising PCM, and a second zone not comprising PCM. Coolant flow through the two zones may be regulated by the radiator control valve 89 based on the temperature of the coolant. Thus, the position of the radiator control valve 89 may be adjusted between an open first position where coolant flows through the first zone of the radiator and a closed second position where coolant flows through the second zone of the radiator. Thus, in response to fluctuations in the temperature of the coolant, the position of the radiator control valve may be adjusted to change the flow of coolant within the radiator 72.

The cooling system 10 may also include a fan 84 to direct ambient air flow through the radiator 72, and thus increase the cooling rate of the coolant passing through the radiator. Suitable fan 84 may have one or more of a variable speed drive, variable pitch blade, and reversible motor to change air speed and flow direction through the radiator 72. The fan 84 may contain an electric motor for powering the one or more fan blades. Further, the electric motor may be in electrical communication with the controller 12. As such, the controller 12 may send signals to the fan 84 to adjust the power and/or speed of the fan 84.

Controller 12 may be configured as a microcomputer including a microprocessor unit, input/output ports, an electronic storage medium for executable programs and calibration values, random access memory, keep alive memory, and a data bus. Controller 12 may receive various signals from sensors 16 coupled to cooling system 10 such as temperature sensor 90, pressure sensor in radiator 72, etc. Furthermore, controller 12 may monitor and employ the use of various actuators 81 to adjust the position of various valves, for example temperature control valve 74, heater control valve 86, radiator control valve 89, diverter valve 82, etc., based on the received signals and instructions stored in the memory of the controller. The controller 12 may monitor coolant temperature, fuel flow rate, airflow rate, and engine knock information via the outputs of various sensors. Based upon these factors, the controller may determine the appropriate amount of coolant flow through the engine 52 and/or speed of fan 84 to maintain the coolant to within a desired temperature range. The desired temperature range of the coolant will be explained in greater detail below with reference to FIG. 4. Storage medium read-only memory in controller 12 can be programmed with computer readable data representing instructions executable by a processor for performing the methods described below in combination with the engine system components described above (e.g., the various sensors and actuators), as well as other variants that are anticipated but not specifically listed. Example methods and routines are described herein with reference to FIG. 4.

In this way a cooling system may comprise: an engine, a pump for circulating coolant in the cooling system, a radiator comprising two zones, a first zone containing a phase change material (PCM) and a second zone not containing PCM, the radiator further comprising a radiator control valve for selectively controlling coolant flow to each of the first and second zones, and a controller. The controller may include computer readable instructions for adjusting a position of the radiator control valve to a first position and flowing coolant only to the first zone and not the second zone, in response to one or more of a temperature of the coolant increasing above a first threshold and decreasing below a second threshold, the second threshold being less than the first threshold. The controller may include additional computer readable instructions for adjusting the position of the radiator control valve to a second position and flowing coolant only to the second zone and not the first zone, in response to one or more of a the temperature of the coolant increasing above a third threshold, the third threshold being greater than the second threshold but less than the first threshold, and decreasing below the first threshold. The computer readable instructions may further include instructions for adjusting a position of the temperature control valve to a first position and flowing coolant through the radiator bypass in response to the temperature of the coolant decreasing below the first threshold. The radiator may further comprises a coolant inlet in fluidic communication with the cooling system and the radiator for flowing coolant from outside the radiator into an inlet tank of the radiator, the inlet tank being in fluidic communication with the first zone and second zone and wherein the radiator control valve is positioned in the inlet tank of the radiator and is in fluidic communication with the coolant inlet, first zone, and second zone.

Moving on to FIG. 2, it shows a side perspective view 200 of an example radiator 250 that may be used in the cooling system 10 described above with reference to FIG. 1. Radiator 250 shown in FIG. 2 is an example of radiator 72 shown in FIG. 1. As such, in some examples radiator 250 may be radiator 72 from FIG. 1. As shown in FIG. 2, radiator 250 may be shaped like a rectangular prism. However, in other embodiments, the radiator 250 may take on other prismatic shapes, such as triangular, square, hexagonal, cylindrical, irregularly-shaped, etc.

An axis system 240 is shown in FIG. 2 including a vertical, horizontal, and lateral axis. Throughout this disclosure, the relative positioning of components of the radiator 250 may be described by their vertical, horizontal and/or lateral positions, as shown by the arrows in FIG. 2. In particular, "top," and "bottom" may be used herein to refer to the physical boundary or extent of a component in the vertical direction. Further, "above" may be used to describe the relative position of a component in the positive vertical direction with respect to another component, while "below" is used to describe the relative position of a component in the negative vertical direction with respect to another component.

The radiator 250 comprises a cooling core 202, positioned between an inlet tank 204 and an outlet tank 206. A top plate 208 and bottom plate 210 may be fastened to the inlet tank 204 and outlet tank 206, at either end of the cooling core 202, to provide structure and support for the radiator 250. Thus, the physical extent of the cooling core 202 in the vertical and horizontal directions may be defined between the inlet tank 204 and outlet tank 206, and between the top plate 208 and bottom plate 210. The top plate 208 and bottom plate 210 may be fastened using any suitable method such as welding, injection molding, bolts, screws, etc. Further, the inlet tank 204 and outlet tank 206 may extend along the full vertical extent of the cooling core 202.

For purposes of simplicity, the fine-scale structure and configuration of the cooling core 202 has been omitted from the radiator 250 shown in FIG. 2. However, while not shown in FIG. 2, the cooling core 202 comprises a plurality of tubes and fins for cooling the coolant as it passes through radiator 250. The complete structure and configuration of the cooling core 202, including its tubes and fins, will be shown and described in greater detail below with reference to FIG. 3.

A coolant inlet 222 for receiving coolant from a cooling system, (e.g., cooling system 10 from FIG. 1) is provided in the inlet tank 204. Specifically, the coolant inlet 222 may be fluidly coupled at one end to a coolant passage (e.g., coolant outlet line 70 from FIG. 1), thereby supplying coolant from an engine (e.g., engine 52 from FIG. 1) to the radiator 250. At its other end, coolant inlet 222 may be fluidly coupled to inlet tank 204. As such, after flowing through the engine, coolant may flow to the coolant inlet 222 of the radiator 250. Thus, coolant inlet 222, may direct coolant from outside the radiator 250 into the interior of radiator 250, and specifically into inlet tank 204. Similarly, outlet tank 206 includes a coolant outlet 224, for directing coolant from the radiator 250 back to the other components of the cooling system, such as the engine. Specifically, the coolant outlet 224 may at one end be fluidly coupled to the outlet tank 206, and at the other end be coupled to a coolant passage (e.g., recirculation line 79 from FIG. 1), for flowing coolant to a water pump (e.g., water pump 66 from FIG. 1). Thus, coolant inlet 222, may direct coolant from inside the radiator 250, to outside of the radiator 250, and specifically to the cooling system pump and engine.

Coolant may therefore flow into the radiator 250 via coolant inlet 222, and first through the inlet tank 204, then the cooling core 202, and finally the outlet tank 206, before exiting the radiator 250 via coolant outlet 224. Thus, the coolant inlet 222 is upstream of the inlet tank, which is upstream of the cooling core 202, which is upstream of the outlet tank 206. The radiator 250 may also include a fan (e.g., fan 84 from FIG. 1). The fan is configured to blow air through the cooling core 202 to cool the coolant flowing through the radiator 250 as described above in greater detail with reference to FIG. 1. In one example, the fan may be physically coupled to the exterior of the radiator 250. In another example the fan may be included within the radiator 250. In a further example, the fan may be positioned a distance away from the radiator 250.

The radiator 250 additionally includes a coolant control valve 226 (e.g., radiator control valve 89 shown in FIG. 1). In some examples, the coolant control valve 226 may be the same as radiator control valve 89, as described above with reference to FIG. 1. As will be described in greater detail below with reference to FIGS. 3 and 4, the coolant control valve 226 may regulate coolant flow to different zones of the cooling core 202 based on the temperature of the coolant. Thus, in response to fluctuations in the temperature of the coolant, the position of the radiator control valve 226 may be adjusted to change the flow of coolant within the radiator 250. In one embodiment, the radiator control valve 226 may be a thermostatic valve, whereby changes in the coolant temperature may cause a change in the position of the radiator control valve 226. Specifically, the radiator control valve 226 may comprise a fluid or solid that may expand or contract depending on the temperature of the coolant. As an example, the radiator control valve 226 may comprise a wax element. The wax may melt in response to increasing coolant temperatures and as the wax melts it may expand. Expansion of the wax may provide a pressure force which may directly or indirectly actuate the position of the radiator control valve 226. In another embodiment, the coolant control valve may be an actuated valve, whereby the position of the coolant control valve 226 may be adjusted by an actuator, the actuator being controlled by a controller (e.g., controller 12. from FIG. 1). In one example the actuator may be an electric motor. In other examples, the actuator may be any other suitable actuator, such as pneumatic, or hydraulic. The controller may send electrical signals to the actuator for adjusting the position of the coolant control valve 226, based on feedback from a temperature sensor (e.g., temperature sensor 90 from FIG. 1).

As shown in FIG. 2, the cutting plane 275 defines the cross-section of the radiator shown in FIG. 3.

Turning now to FIG. 3, it shows a side-sectional view 300 of the example radiator 250 described above with reference to FIG. 2. As such, components described above with reference to FIG. 2 may be numbered the same in FIG. 3. A cross-section of the radiator 250 has been cut along the cutting plane 275 shown in FIG. 2, exposing the interior of the cooling core 202 of the radiator 250. Specifically, a plurality of tubes 218 (e.g., internal cooling tubes) are shown arranged in a single vertical column of tubes 218 in the cooling core 202. It is important to note that there may be more than one column of tubes 218, as FIG. 3 shows only a cross-section of radiator 250.

The cooling core 202 comprises two distinct zones (zones may also be referred to herein as distinct and fluidly separate portions or sections of the cooling core 202): a PCM-containing first zone 212, and a second zone 214, the second zone not containing PCM. For the purposes of clarity, the two zones 212 and 214 are shown separated by a space 216. Thus, first zone 212 and second zone 214 may be separated from one another by space 216, whereby no additional components are included between the two zones. However, in other examples, the first zone 212 and second zone 214 may not be separated by a space. In one example, the first zone 212 and second zone 214 may be physically coupled to one another. In another example, the first zone 212 and second zone 214 may not be physically coupled to one another, however, additional components may exist between the first zone 212 and second zone 214. Specifically, additional components may be in physical contact and/or are physically coupled to both zones.

The PCM-containing first zone 212 may be positioned above the second zone 214. Both the first zone 212 and second zone 214 comprise a plurality of hollow tubes 218, where each of the tubes 218, extend from the inlet tank 204 to the outlet tank 206. Specifically, a first end of each of the tubes 218 including a first opening may be fluidly coupled to the inlet tank 204, while the opposite end of each of the tubes 218 including a second opening may be fluidly coupled to the outlet tank 206. The tubes 218 each comprise hollow interiors which allow for fluid (e.g., coolant) to pass through. Further, a plurality of fins 221 in the second zone 214 may be coupled to the exterior of the tubes 218 and may extend along the full length of each of the tubes 218. A plurality of PCM fins 220 in the first zone 212 may be coupled to the exterior of the tubes 218 in the first zone 212 and may extend along the full length of each of the tubes 218 in the first zone 212. The portion of the tubes 218 contained within the first zone 212 may not be in fluidic communication with the portion of the tubes 218 contained within the second zone 214. As such, the first zone 212 and second zone 214 may not be in fluidic communication with one another and are separate. Thus, once coolant enters the first zone 212, it does not also flow through the second zone 214. Similarly, once coolant enters the second zone 214, it does not also flow through the first zone 212.

The plurality of fins 221 contained within the second zone 214 of the radiator 250 are made of a conductive material. In one example, the conductive material may be aluminum. However, in another examples, the conductive material may be one or more of copper, brass, copper alloy, etc. As such, the fins 221 contained within the second zone 214 may increase the dissipation of heat from coolant flowing through the portion of the tubes 218 contained within the second zone 214. Thus, as the fan blows air through the second zone 214 of the radiator 250 and over the fins 221, the portions of fins 221 contained within the second zone 214 may increase the amount of heat dissipated from coolant flowing through the portion of hollow tubes 218 contained within the second zone 214.

The PCM fins 220 contained within the first zone 212 of the radiator comprise a phase change material (PCM). The phase change material (PCM) is in thermal contact with the liquid coolant inside the portion of the tubes 218 included within the first zone 212 of the cooling core 202. The PCM is solid below its melting temperature. However, when exposed to temperatures above its melting temperature, the solid PCM begins to melt. The energy absorbed by the PCM to change phase from solid to liquid at its characteristic melting temperature is known as the latent heat of fusion. The latent heat of fusion stored in the liquid state is released upon resolidification. Thus, the PCM may absorb thermal energy from a body at a higher temperature than the PCM, while maintaining its temperature at its melting temperature, until the PCM undergoes a reversible melt. A molten PCM may transfer thermal energy to a body at a lower temperature than the PCM and may thereby undergo a reversible solidification (freeze).

The PCM may have a melting temperature which is higher than a desired range of coolant temperatures, as determined by a controller (e.g., controller 12 from FIG. 1) of the cooling system (e.g., cooling system 10 from FIG. 1). The desired range of coolant temperatures will be described in greater detail below with reference to FIG. 4. In addition, the PCM melting temperature may be lower than the temperature at which a pressure relief valve (e.g., coolant pressure relief valve 88 from FIG. 1) opens. The PCM may include organic and/or inorganic materials such as one or more of calcium chloride hexahydrate ($MgC_{12}H_{12}O_6$), benzoic acid ($C_6H_5COOH$), and erythritol ($C_4H_{10}O_4$). Thus, the PCM may store heat when transitioning from a solid to a liquid through the latent heat of fusion. As such, the PCM may also be capable of transferring heat to a fluid passing through the tubes 218 coupled to the PCM fins 220 containing the PCM.

In some examples, PCM is included within the fins 220 contained within the first zone 212. As such, the PCM fins 220 may comprise a hollow exterior shell made of a conductive material such as aluminum. The PCM may be included within the shell of the PCM fins 220, so that the PCM fins 220 comprise a conductive hollow shell filled with PCM. In another example, the portion of the PCM fins 220 included in the first zone 212 may be exclusively made of PCM and may not comprise a conductive shell. As such, the tubes 218 in the first zone 212 may be fully encased with PCM. Thus, PCM may extend fully between the tubes 218 in the first zone 212. Said another way, each tube of the tubes 218 in the first zone 212 may be surrounded around an exterior of the tube by PCM.

In some examples, the PCM fins 220 included in the first zone 212 and the fins 221 in the second zone 214 may physically contact and/or be physically coupled to the exterior of two adjacent tubes of the plurality of hollow tubes 218. In the example shown in FIG. 3, the fins 221 in the second zone 214 may extend between each of the plurality of tubes 218 in a zig-zag pattern. Said another way, when proceeding in the horizontal direction (from left to right in FIG. 3) between two adjacent tubes 218, there may be an alternating pattern of fins 221 and air passages 228, whereby one is followed by the other. Thus, air passages 228 may exist between the fins 221, allowing for air to pass through the cooling core 202 in the lateral direction (where the lateral direction is perpendicular to the direction of fluid flow through the tubes 218). Said another way, air being blown by the fan, may pass through the air passages 228 between each of the fins 221. In other examples, the fins 221 may physically contact and/or be physically coupled to two adjacent tubes of the tubes 218 in other patterns. For example, the fins 221 may be arranged between adjacent tubes in a lattice, parallel, serpentine, etc. In further examples, the fins 221 may only be physically coupled to one of the plurality of tubes 218. In such examples, the fins 221 may be rectangular, and may be physically coupled to the tubes 218 on one edge and/or side. One or more than one fin may be coupled to each of the tubes 218. In other examples, the fins 221 may be coupled to each of the tubes 218 independently, in a spiral formation, or other suitable pattern. As such, each of the plurality of tubes 218 has multiple fins 221 physically coupled to its exterior surfaces. In still further examples, the fins 221 may be physically coupled to more than two adjacent tubes 218. Said another way, the fins 221 may be physically coupled to two adjacent tubes 218 in both the vertical and lateral directions.

Further, the portion of the PCM fins 220 included in the first zone 212 of the cooling core 202, may occupy all of the space between each of the tubes 218. Therefore air passages 228 may not exist between the PCM fins 220 included in the first zone 212. As such, the portion of PCM fins 220 included in the first zone 212 may extend fully between exterior surfaces of adjacent tubes 218 included in the first zone 218. Thus, the PCM fins 22 included in the first zone 212 may extend in the vertical direction between adjacent rows of tubes 218, such that the PCM fins 220 physically touch and/or are physically coupled to adjacent rows of tubes 218. Additionally or alternatively, the PCM fins 220 included in the first zone 212 may extend in the lateral direction between adjacent columns of tubes 218, such that the PCM fins 220 physically touch and/or are physically coupled to adjacent columns of tubes 218 included in the first zone 212. Said another way, there may be no empty space between the tubes 218 included in the first zone 212 of the cooling core. The PCM fins 220 in the first zone 212, may occupy all three dimensional space between the tubes 218 of the first zone 212. Thus, air my not flow between the tubes 218 included in the first zone 212 of the cooling core 202, and may only flow between the tubes 218 included in the second zone 214 of the cooling core 202. Since the PCM fins 220 may only comprise PCM, PCM may occupy all three dimensional space between adjacent tubes 218, such that all of the tubes 218 in the first zone 212 are encased in PCM.

Coolant is directed into the radiator 250 via the coolant inlet 222. Specifically, coolant first enters the inlet tank 204 via the coolant inlet 222. The flow of the coolant from the inlet tank 204 to each of the first zone 212 and the second zone 214 depends on the position of the coolant control valve 226. The coolant control valve 226 is adjustable between a first position where coolant flows to the first zone 212 and not the second zone 214, and a second position where coolant flows to the second zone 214 and not the first zone 212. In the description herein, the first position and second position of the valve may be referred to as "open" and "closed," respectively. For example, in the open position, the valve 226 is open to the first zone and closed to the second and in the closed position, valve 226 is closed to the first zone and open to the second zone. However, in alternate embodiments, the "open" and "closed" positions of the valve may be reversed.

As one example, if the coolant control valve 226 is fully closed, then coolant only flows along first flow path 230 through the tubes 218 of the second zone 214 of the cooling core 202. In the example of the coolant control valve 226 being a wax thermostat element, the valve may be closed when the coolant temperature is below a threshold, the threshold being a threshold temperature sufficient to melt the wax in the valve 226 and cause a pressure increase in a chamber of the valve 226 which results in the opening of the valve 226. In the closed position, the valve 226 restricts the flow of coolant along the first flow path 232 such that no coolant flows through the tubes 218 in the first zone 212. However, if the coolant control valve 226 is in an open position, coolant flows along the second flow path 232 to the tubes 218 of the first zone 212 of the cooling core 202. In the example of the coolant control valve 226 being a wax thermostat element, the valve 226 may be open when the coolant temperature is above the threshold.

In one embodiment, coolant may only flow to the first zone 212 and not the second zone 214 when the control valve 226 is open. As such, coolant control valve 226 may be a three-way valve positioned between the first flow path 230 and second flow path 232, whereby the flow of coolant from the coolant inlet 222 can be selectively directed to either the first zone 212 or the second zone 214 of the cooling core 202, but not both. Coolant control valve 226 may therefore be positioned at junction between the first and second flow paths, 230 and 232, respectively. Thus, the position of coolant control valve 226 may be adjusted between an open first position and a closed second position to direct coolant to either the first zone 212 or the second zone 214. When the coolant control valve 226 is in the first position coolant does not flow to the second zone 214 but does flow to the first zone 212. However, in the closed second position coolant control valve 226 restricts coolant flowing first zone 212 and allows coolant to flow only to the second zone 214.

In another embodiment, the coolant control valve 226 may not be a three-way valve, and may be a valve positioned in the second flow path 232. In such an embodiment, when the coolant control valve 226 is in a closed position, coolant may only flow to the second zone 214 and not the first zone 212. However, in an open position, the coolant control valve may allow a portion of the coolant to flow to the first zone 212. As such coolant may flow through both the first zone 212 and second zone 214 simultaneously.

When the coolant control valve 226 is open, coolant flows along the second flow path 232 to the first zone 212 containing the PCM fins 220. If the temperature of the coolant flowing through the first zone 212 is at a higher temperature than the melting temperature of the PCM, then the PCM gradually melts and cools the coolant by removing heat from it. The temperature of the coolant may be higher than the melting temperature of the PCM when the engine load and/or temperature is above a threshold, such as when one or more of the vehicle containing the engine is traveling up a hill and, the vehicle is towing a trailer, etc. However, if the temperature of coolant flowing through the first zone 212 is less than the solidification temperature of the PCM, such as during normal engine operation, engine cruising, engine idle etc., then the PCM transfers heat to the coolant and gradually solidifies. In this way, the first zone 212 may remove and store engine waste heat from the coolant during peak engine load conditions. As such, flowing coolant through the first zone 212 may decrease the likelihood of the coolant temperature increasing above the boiling point of the coolant. Limiting the coolant temperature so that it does not exceed its boiling temperature may therefore reduce the chances of the coolant pressure relief valve from opening. Thus, the configuration of radiator 250 may allow for the reduction in the amount of coolant lost from the cooling system.

In the example of radiator 250 shown in FIG. 3, the tubes 218 may not be fluidly coupled to one another. As such, coolant may flow from the coolant inlet 222 to an upstream opening of each of the tubes 218 individually. That is, coolant may flow to the open end of each of the tubes 218 that is fluidly coupled to the inlet tank 204. In other example, coolant may not flow through each and every tube in the plurality of tubes 218, but may flow to only a portion of the tubes 218. Therefore, coolant flow in the cooling core 202 of the radiator may be unidirectional along the positive horizontal axis, as depicted in FIG. 3. Coolant may flow from the inlet, through the inlet tank 204, to the ends of the tubes 218 fluidly coupled to the inlet tank 204, and then may flow through one or more of the tubes 218 to the outlet tank 206. Upon reaching the outlet tank 206, coolant may flow to the coolant outlet 224, and out of the radiator 250.

However, other flow configurations for the flow of coolant in the tubes 218 are possible. For example, the flow of coolant in the tubes 218 may not be unidirectional, and instead may be bidirectional. In such an example, the same ends of adjacent tubes may be physically and/or fluidly coupled to one another. Each of the plurality of tubes has two adjacent tubes, as shown in FIG. 3. Thus, in the example configuration with bidirectional coolant flow, each tube in the plurality of tubes 218, at one end the tube is physically and/or fluidly coupled to one of the adjacent tubes, while at the other end, the tube is physically and/or fluidly coupled to the other adjacent tube. Therefore, in this configuration, coolant would flow from the coolant inlet 222 to the end of only one of the plurality of tubes 218 in the second zone 214 and/or the first zone 212, the end of the tube being fluidly coupled to the inlet tank 204. Coolant would then flow through the tube in the positive horizontal direction to the opposite end of the tube, where it would then flow to adjacent tube, and reverse direction and flow through the next tube in the negative horizontal direction, where the negative horizontal direction is opposite the positive horizontal direction. This serpentine flow may continue until the flow reaches the last tube, and ends in the outlet tank 206. Therefore, the portion of the tubes in the first zone 212 may have a tube that is open only at an end in fluidic communication with the inlet tank 204, while another tube is open only at an end in fluidic communication with the outlet tank 206. The portion of the tubes in the second zone 212 may be arranged in the manner described above for the tubes in the first zone 212. Thus, for each of the first and second zones, 212 and 214 respectively, coolant may flow from the inlet tank into a single tube, and out into the outlet tank 206 from a single tube.

It is important to note that multiple iterations of the configuration above could be used within each of the first and second zones 212 and 214, respectively. Said another way, instead of one longer bidirectional path of coolant flow in the cooling core 202, several shorter bidirectional paths could exist. As such, coolant may flow to multiple tubes in the plurality of tubes 218, and may similarly exit the tubes 218 into the outlet tank 206, through a multiple of different tubes.

In this way, a cooling system comprises an integrated radiator with two distinct zones. The two zones comprise a plurality of tubes (e.g., internal fluid tubes flowing coolant) for conducting coolant through the radiator. A second zone comprises a series of heat conductive fins arranged between the tubes with air passages allowing for air to flow between the fins. Thus, a radiator fan blows air through the second zone of the radiator, specifically through the air passages formed between the tubes and fins of the second zone. As such, the second zone of the radiator may function similarly to a traditional radiator, by blowing air past tubes containing coolant, to increase an amount of cooling of the coolant. A first zone comprises PCM, capable of absorbing heat from coolant in the cooling system. The first zone of the radiator provides a system for cooling the coolant when it increases above a threshold temperature, whereby the conventional method of blowing air past the coolant may not be sufficient to decrease the coolant temperature below the boiling temperature of the coolant. Specifically the PCM may be able to absorb and store heat from the coolant flowing through internal tubes of the radiator when melting from a solid to a liquid. Due to the high melting temperature of the PCM, the first zone of the radiator may reduce the temperature of the coolant even at high coolant temperatures that may exist when a load of an engine of the cooling system is above a threshold. Further, because the PCM is capable of storing heat from the coolant when changing from a solid to a liquid, the PCM may further provide heat back to the coolant when changing back to a solid from a liquid. As such, the PCM may also heat the coolant when the cool temperature is less than a threshold as will be described below with reference to FIG. 4.

Thus, a system and method for regulating coolant flow in a cooling system may include first directing coolant to either a radiator or a radiator bypass based on the temperature of the coolant as shown above with reference to FIG. 1 in the example cooling system 10. If the coolant is directed to the radiator, the flow of coolant within the radiator is further directed to one or more of a first zone containing PCM and a second zone where air is blown past the coolant by a fan as shown in the example radiator 250 described above with reference to FIGS. 2 and 3.

In this way, a radiator may comprise: a first set of coolant tubes, each tube of the first set encased with a phase change material (PCM), a second set of coolant tubes, each tube of the second set not encased with the PCM, and a valve disposed within an inlet tank of the radiator and in fluid communication with a coolant inlet of the radiator, the valve fluidly separating the first and second set of coolant tubes. The valve may divide the inlet tank into a first portion in fluid communication with tube inlets of the first set of cooling tubes and a second portion in fluid communication with tube inlets of the second set of cooling tubes. Further, the valve may be adjustable between a first position communicating coolant from the coolant inlet to only the first set of coolant tubes and a second position communicating coolant from the coolant inlet to only the second set of coolant tubes. The second set of coolant tubes may further comprise a plurality of heat conductive fins coupled to exterior surfaces of one or more adjacent coolant tubes of the second set of coolant tubes, where the fins are spaced away from one another to form air passages through which air flows perpendicularly to a flow of coolant in the radiator. In some examples, the valve may be a passive thermostatic valve comprising a temperature sensitive element and wherein the position of the valve is adjusted in response to changes in coolant temperature at the valve. The PCM may extend fully between exterior surfaces of adjacent coolant tubes of the first set of coolant tubes and the PCM physically couples all coolant tubes of the first set of coolant tubes to one another.

Figure 4:
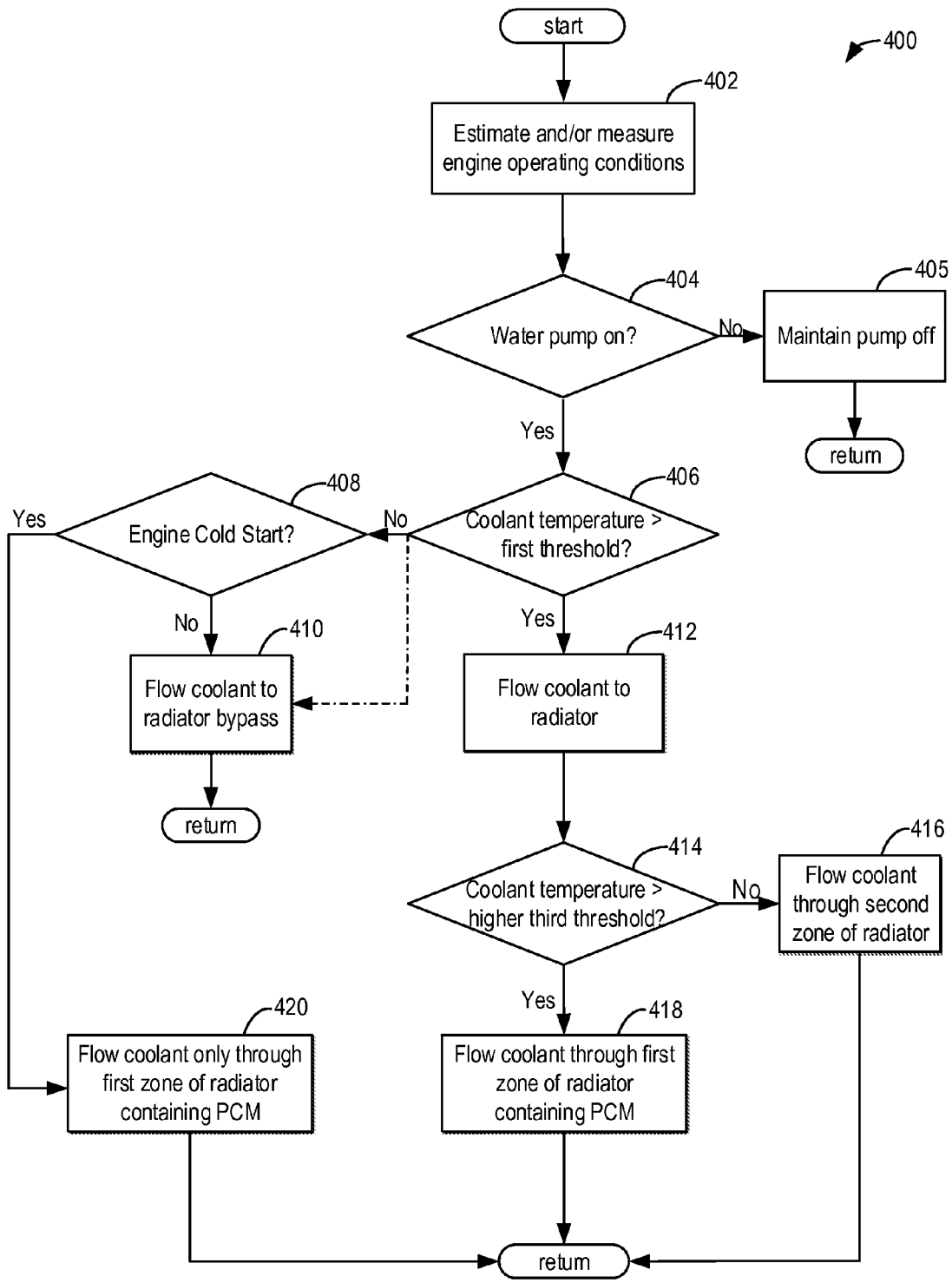
FIG. 4 is a flow chart of an example method for regulating the flow of coolant in an engine cooling system.

Turning now to FIG. 4, it shows a flow chart of an example method 400 for regulating coolant flow in a cooling system (e.g., cooling system 10 from FIG. 1). Method 400 may be stored in the memory of a controller (e.g., control 12 from FIG. 1), and as such may be executed by the controller in combination with the various sensors and actuators of an engine cooling system (such as the engine coolant system 10 shown in FIG. 1). Specifically, the controller may receive signals from various sensors in the cooling system such as a temperature sensor (e.g., temperature sensor 90 from FIG. 1). The temperature of the coolant as estimated from the outputs of the temperature sensor is the temperature of the coolant as it passes through a radiator (e.g., radiator 72 from FIG. 1). In one example, the temperature sensor may be positioned within the radiator. As such, the temperature sensor may be positioned upstream of a radiator control valve (e.g., coolant control valve 226 from FIGS. 2-3). In other examples, the temperature sensor may be positioned upstream of the radiator between an engine (e.g., engine 52 from FIG. 1) and the radiator.

In response to received signals, the controller may execute method 400, which may involve sending electrical signals to various actuators to adjust the position of one or more valves in the cooling system (e.g., temperature control valve 74 and coolant control valve 89 from FIG. 1, and/or coolant control valve 226 shown in FIGS. 2-3). Thus, in the description of method 400 herein, when the method 400 comprises adjusting the position of a valve, the method 400 may include sending signals from the controller to an actuator of the respective valve, the actuator capable of adjusting a position of the valve. Additionally, the controller may send signals to other actuators to adjust the speed of and/or power supplied to one or more of a fan (e.g., fan 84 from FIG. 1) of a radiator (e.g., radiator 72), water pump (e.g., water pump 66 from FIG. 1), etc. Thus, in some examples, method 400 may be executed by controller 12 from FIG. 1. In alternate embodiments, as explained below, the coolant control valve adjusting the flow of coolant within the radiator may be passively controlled responsive to coolant temperature and not controlled via an electronic controller. As such, portions of method 400 may be controlled passively responsive to coolant temperature.

Method 400 begins at 402, which comprises estimating and/or measuring engine operating conditions. Engine operating conditions may include one or more of: engine speed, engine load, engine temperature, coolant temperature, radiator fan speed, power provided to a water pump, radiator pressure, etc. Based on the estimated and/or measured engine operating conditions at 402, method 400 continues to 404 and determines if the water pump pumping coolant in the engine cooling system is on. In one example, if the water pump is powered by its own electric motor, the method 400 at 404 may comprise determining if the electric motor is on and providing power to the water pump. In another example, if the water pump is powered by an engine (e.g., engine 52 from FIG. 1) of the cooling system, then the method 400 at 404 may comprise determining if the engine is on and providing power to the water pump. In further examples, the method 400 at 404 may involve determining if coolant is circulating in the coolant system, which may be determined based on one or more of the operation of the water pump, pressure in the radiator as estimated from outputs of a pressure sensor (e.g., pressure relief valve 88 from FIG. 1), temperature in a coolant passage (e.g., coolant outlet line 70 from FIG. 1) as estimated from outputs of a temperature sensor positioned in the passage (e.g., temperature sensor 90). Thus, it may be determined that coolant is circulating in the cooling system if one or more of the water pump is on, the engine is one, pressure in the radiator is above a threshold pressure, and temperature in the coolant passage is above a threshold temperature.

If it is determined at 404 that the water pump is not on, and/or coolant is not circulating in the cooling system, then the method 400 continues to 405 which comprises maintaining the pump off. Method 400 then returns. However, if coolant is circulating in the cooling system, method 400 continues from 404 to 406, where it is determined if the coolant temperature is above a first threshold. The coolant temperature is a temperature of the coolant entering the radiator, downstream from the engine. The coolant temperature may be estimated based on outputs from the temperature sensor positioned in the coolant passage between the engine and the radiator. The first threshold is a threshold temperature, which may be a temperature above which coolant is directed to the radiator. In one example the first threshold temperature is approximately the same as the boiling temperature of the coolant. In another example, the first threshold is less than the boiling temperature of the coolant.

If it is determined at 406 that the coolant temperature is below the first threshold, then method 400 may proceed to 408 and may determine if there is an engine cold start. However, in other embodiments, method 400 may proceed directly from 406 to 410 if it is determined at 406 that the coolant temperature is below the first threshold. Thus, the method 400 at 410 may involve flowing coolant only through a radiator bypass (e.g., radiator bypass line 76 shown in FIG. 1) and not through the radiator. In other examples, the method 400 at 410 may involve flowing only a portion of the coolant in the cooling system through the radiator bypass. The directing of the coolant to one or more of the radiator bypass and radiator may involve adjusting the position of temperature control valve (e.g., temperature control valve 74 shown in FIG. 1) in fluidic communication with the radiator bypass and the radiator. As such, the position of the temperature control valve may be adjusted between a first position and a second position. The first position is a position of the valve in which, the flow of coolant in the cooling system flows through the radiator bypass. As such, when the temperature control valve is in the first position, coolant does not flow to the radiator. In the second position, the temperature control valve may restrict the flow of coolant to only the radiator, and thus coolant may not flow to the radiator bypass. It is important to note that the position of the temperature control valve may also be adjusted to any position between the first and second positions, to allow coolant to flow to both the radiator and the radiator bypass. Thus, the method at 410 may comprise adjusting the temperature control valve to the first position, to only flow coolant through the radiator bypass. Method 400 then returns.

Returning to 408, the method includes determining if engine cold start conditions exist. Determining if an engine cold start has occurred may comprise, for example, determining if the engine has started, and if so, if cold-start conditions are satisfied. For example, the engine is off when no combustion occurs within the engine and there is no rotation (i.e., zero speed). Determining if the engine has started may comprise, for example, determining if an on/off button is pressed or a similar user input (such as a key start) has been performed while the vehicle has been in an off mode. By beginning this process when fuel temperature is cold and continuing as the fuel temperature naturally increases with increased operating temperatures, data points may be obtained over a desired temperature range.

In one example, determining if cold-start conditions are satisfied may comprise determining how much time has passed since a key-off event. For example, if the time since a key-off event is greater than a threshold, then the engine may be assumed to satisfy cold-start conditions. Cold-start conditions may include one or more system temperatures below one or more temperature thresholds. As such, in another example, determining if cold-start conditions are satisfied may include determining if one or more system temperatures are below one or more temperature thresholds. For example, an engine coolant temperature (ECT) below a temperature threshold may indicate that the engine has not yet warmed up beyond cold-start conditions, while a fuel system temperature below a temperature threshold may indicate that a fuel system has not been warmed by engine operating conditions. In some examples, determining if cold-start conditions are satisfied may include determining that all system temperatures are below a same threshold in conjunction with determining a time since last key-off.

In other embodiments, the method 400 at 408 may alternatively only include determining if the temperature of the coolant is below a lower, second threshold, the second threshold being less than the first threshold. The temperature of the coolant may be estimated in the manner described above at 406.

If it is determined that engine cold start conditions do not exist and/or the temperature of the coolant is not below the second threshold at 408, then method 400 proceeds to 410 and flows coolant to a radiator bypass in the manner described above at 410 of method 400. Method 400 then returns.

If it is determined at 408 that engine cold start conditions do exist and/or the temperature of the coolant is below the second threshold, then method 400 proceeds to 420 and flows coolant to the radiator, but only through a PCM-containing first zone of the of the radiator (e.g., PCM-containing first zone 212 as shown in FIG. 3). Thus, the method at 400 at 420 may involve flowing coolant only through the radiator and not through the radiator bypass. In other examples, the method 400 at 410 may involve flowing only a portion of the coolant in the cooling system through the radiator, while another portion of the coolant may flow through the radiator bypass.

In all examples, however, coolant flowing to the radiator only flows through the first zone of the radiator containing the PCM at 420 and not a second zone of the radiator (e.g., second zone 214 shown in FIG. 3). The second zone of the radiator does not comprise PCM as described above with reference to second zone 214 in FIG. 3. The flow of coolant within the radiator may be regulated by a radiator control valve (e.g., coolant control valve 226 as shown in FIGS. 2 and 3). Thus, the radiator control valve is positioned in a flow path in fluidic communication with both the first and second zones of the radiator. Further, the position of the radiator control valve may be adjusted between a first position and a second position. The first position is a position of the valve in which flow through the radiator is restricted to the first zone only. As such, when the radiator control valve is in the first position, coolant may not flow to the second zone of the radiator. In the second position, the radiator control valve may restrict the flow of coolant to only the second zone of the radiator, and thus coolant may not flow to the first zone of the radiator. It is important to note that, in one embodiment, the position of the radiator control valve may also be adjusted to any position between the first and second positions, to allow coolant to flow to both the first and second zones.

The method 400 at 420 comprises flowing coolant through the first zone of the radiator only, and not through the second zone. As such, the position of the radiator control valve may be adjusted to the first position at 420. After adjusting the position of the radiator control valve to restrict the flow of coolant in the radiator to only the first zone, method 400 then returns.

Returning to block 406 of method 400, if it is determined that the coolant temperature is above the first threshold, then method 400 continues to 412 where the method includes flowing coolant to the radiator, through one or both of the first and second zones. Thus, the method at 400 at 412 may involve flowing coolant only through the radiator and not through the radiator bypass. In other examples, the method 400 at 410 may involve flowing only a portion of the coolant in the cooling system through the radiator, while another portion of the coolant may flow through the radiator bypass. As described above, the flow of coolant to the radiator may be adjusted by adjusting the position of the temperature control valve.

From 412, method 400 then continues to 414, which comprises determining if the coolant temperature is greater than a higher, third threshold, where the third threshold is a threshold temperature that is greater than the second threshold. Further, the third threshold may represent a temperature that is greater than the melting temperature of the PCM included in the first zone (e.g., first portion) of the radiator. The temperature of the coolant may be estimated in the manner described at 406 of method 400. If the temperature of the coolant is determined at 414 to be less than the third threshold, then method 400 proceeds to 416. The method at 416 includes flowing coolant through the second zone of the radiator. The flow of coolant within the radiator may be adjusted by adjusting the position of the radiator control valve as described above at 420 of method 400. In one example, the method 400 at 416 may include only flowing coolant through the coolant tubes of the second zone of the radiator not containing PCM, and not flowing coolant through the coolant tubes of the first zone of the radiator containing PCM. As such, the method at 416 may comprise adjusting the position of the radiator control valve to the second position so that coolant flow is restricted to the second zone of the radiator. However, in another example, the method 400 at 416 may include flowing coolant through both the second zone and the first zone of the radiator. As such, the position of the radiator control valve may be adjusted to between the first and second positions, to allow a portion of the coolant to flow through the second zone of the radiator, and another portion of the coolant to flow through the first zone of the radiator. In such examples, a portion of the coolant flowing through the radiator may be directed through the first zone during normal engine operating conditions, such as during engine idle, engine cruising, and when engine load is below a threshold, etc. Method 400 then returns.

However, if at 414 it is determined that the coolant temperature is higher than the third threshold, then method 400 proceeds to 418. At 418, the method includes flowing coolant through the coolant tubes of the first zone of the radiator containing the PCM. The flow of coolant within the radiator may be adjusted by adjusting the position of the radiator control valve as described above at 420 of method 400. In one example, the method 400 at 418 may include only flowing coolant through the first zone of the radiator not containing PCM, and not through the first zone containing PCM. As such, the method at 418 may comprise adjusting the position of the radiator control valve to the first position so that coolant flow is directed only through the first zone of the radiator.

However, in another example, the method 400 at 418 may include flowing coolant through both the second zone and the first zone of the radiator. However, the flow of coolant to the first zone is always greater than the flow of coolant to the second zone at 418. As such, the position of the radiator control valve may be adjusted to between the first and second positions, to allow a portion of the coolant to flow through the second zone of the radiator, and another portion of the coolant to flow through the first zone of the radiator.

The position of the valve between the first and second positions, and thus the amount of coolant flowing to the first zone relative to the second zone may be based on the coolant temperature. Specifically, the amount of coolant flowing to the first zone may increase with increasing coolant temperatures. Thus, the amount of coolant flowing to the second zone may decrease with increasing coolant temperatures. As such, the position of the coolant valve may move closer to the first position than the second position with increasing coolant temperatures. Method 400 then returns.

In other embodiments, the radiator control valve may be a passively controlled valve containing a temperature sensitive element. In one example the temperature sensitive element may be wax. Thus, in response to changes in temperature, the temperature sensitive element may expand or contract and provide a force by which the position of the valve may be adjusted. As such, the radiator control valve may be moved between the first and second positions by changes in temperature of the coolant. As an example, the temperature sensitive element may expand in response to coolant temperatures exceeding the third threshold, which may result in the position of the valve being moved into the first position so as to only flow coolant to the first zone of the radiator as described at 418 of method 400. As another example, in response to coolant temperature dropping below the third threshold, the temperature sensitive element of the radiator control valve may contract as it cools, and as it contracts may exert a force on the valve, moving it into its second position so that coolant only flow to the second zone of the radiator in the manner described at 416 of method 400. As such, coolant temperature changes, and not the controller may be responsible for adjusting the position of the radiator control valve.

Thus, method 400 comprises flowing coolant to one or more of the radiator and radiator bypass based on the temperature of the coolant. If the temperature of the coolant is above the first threshold, all or a portion of the coolant in the cooling system is directed to the radiator to be cooled by the radiator. If the temperature of the coolant is above the third threshold, then all of the coolant flowing through the radiator may be restricted to the first zone of the radiator containing the PCM, such that coolant only flows through the first zone and not the second zone of the radiator. As such, at excessively high coolant temperatures that may result from peak engine loads such as during hill-climbing, trailer tow modes, etc., the efficiency of the radiator may be improved by flowing the coolant through the first zone of the radiator containing PCM. Thus, at temperatures above the third threshold, the PCM may cool the coolant more efficiently than would otherwise be achieved by blowing air past the coolant (e.g., as in the second zone of the radiator), due to the ability of the PCM to absorb heat from the coolant when changing phases from a solid to liquid. Therefore, at coolant temperatures above the third threshold, the coolant may be cooled more efficiently when flowing through the PCM-containing first zone of the radiator than when flowing through the second zone of the radiator. Said another way, at coolant temperatures above the third threshold, more heat may be absorbed from the coolant if it passes through the first zone, than if it passes through the second zone.

If the temperature of the coolant is below the third threshold, but above the second threshold, then the coolant flow in the radiator may be restricted to flow only through the second zone not containing the PCM. As such, the coolant may be cooled by air being blown past the coolant tubes (e.g., internal coolant passages flowing coolant within the radiator) by the radiator fan. Thus, coolant temperatures ranging from the first threshold to the third threshold may represent a desired operating range of temperatures for the coolant. As such, the coolant temperatures between the first and third thresholds may represent coolant temperatures that result in more fuel efficient engine operation. Specifically, the engine may operate more efficiently within a desired engine temperature range. The coolant temperature range between the first and third threshold may represent the coolant temperatures that more effectively maintain the engine temperature to within the desired engine temperature range. Thus, the desired coolant temperature range may represent a temperature range which results in increased fuel efficiency of the engine.

Further, under conditions like an engine cold start, or cold ambient temperatures, when the temperature of the coolant is below the second threshold, then a portion or all of the coolant in the cooling system may be directed to only the first zone of the radiator containing PCM, to increase the temperature of the coolant. Specifically, the latent heat of fusion stored in the PCM from a time when the PCM underwent a phase change from liquid to solid, may be returned to the coolant to increase its temperature. Thus, in a previous cycle of method 400, if the temperature of the coolant was above the third threshold resulting in the PCM changing from solid to liquid, then in a current cycle of method 400, the latent heat of fusion stored in the PCM may be used to increase the temperature of the coolant. The temperature of the coolant may be increased by flowing coolant through the first zone of the radiator if the temperature of the coolant is below the second threshold. As such the PCM may act as a heat sink, absorbing heat from the coolant when the coolant temperature is above the third threshold, and providing heat to the coolant when the coolant temperature is below the third threshold. By selectively directing coolant to either the first zone of the radiator or the second zone of the radiator based on the temperature of coolant, the amount of time during engine operation in which the coolant temperature is between the first and third thresholds may be increased. Therefore, the fuel efficiency of the engine may be increased.

Additionally in method 400, heat stored in the PCM in the form of the latent heat of fusion may be returned to the coolant during normal engine operation, such as during engine idle, engine cruising, etc. Thus, the relative amount of coolant flowing through the first and second zones of the radiator may be adjusted to regulate the amount of cooling and/or heating of the coolant. As such the method 400 may provide improved coolant temperature control.

In this way, a method may comprise: adjusting a radiator control valve into a first position to flow coolant only through a first zone of a radiator containing phase change material (PCM) and not through a second zone of the radiator not containing phase change material. The method may further include adjusting the radiator control valve into a second position to flow coolant only through the second zone of the radiator and not the first zone. Additionally, the method may include adjusting the radiator control valve into a third position between the first and second positions to flow coolant to both the first zone and second zone of the radiator. The radiator control valve may be a three-way valve in fluidic communication with the first zone and second zone of the radiator, and a coolant inlet of the radiator, where the coolant inlet is positioned upstream of the first zone and second zone. The first and second zones each comprise a plurality of hollow tubes for conducting coolant through the radiator, and wherein flowing coolant through the first zone comprises flowing coolant through one or more of the tubes in only the first zone, and flowing coolant through the second zone comprises flowing coolant through one or more of the tubes in only the second zone. In some examples, one or more heat conductive fins are physically coupled to each of the plurality of tubes. In still further examples, PCM may be included within the heat conductive fins of the first zone only. Further, adjusting the radiator control valve into each of the first and second positions may be performed via an electronic controller responsive to a temperature of the coolant estimated based on an output from a temperature sensor positioned upstream of the radiator and downstream of an engine. The electronic controller may further adjust the radiator control valve, wherein adjusting the radiator control valve into the second position may be responsive to one or more of a temperature of the coolant temperature increasing above a first threshold and the temperature of the coolant decreasing below a second threshold, the second threshold being greater than the first threshold. Additionally or alternatively, the adjusting the radiator control valve into the first position may be responsive to one or more of the temperature of the coolant increasing above the second threshold and the temperature of the coolant decreasing below a third threshold, the third threshold being lower than the first threshold. A melting temperature of the PCM may be less than a boiling point of the coolant. In other examples, the radiator control valve may be a passive wax thermostat valve, wherein the position of the valve is adjusted from the second position to the first position in response to coolant temperature at the valve increasing above a non-zero threshold.

In another representation, a method for circulating coolant in a cooling system may comprise flowing coolant through an engine to a radiator, the radiator comprising two zones comprising a plurality of hollow tubes and conductive fins for cooling the coolant, the two zones comprising a first zone containing PCM, and a second zone not including PCM. The method may further comprise flowing coolant only to the first zone and not the second zone of the radiator in response to one or more of a temperature of the coolant increasing above a first threshold and decreasing below a second threshold, the second threshold being less than the first threshold, by adjusting a position of a radiator control valve included in the radiator to a first position. Additionally or alternatively, the method may comprise flowing coolant only to the second zone and not the first zone, in response to one or more of a the temperature of the coolant increasing above a third threshold, the third threshold being greater than the second threshold but less than the first threshold, and decreasing below the first threshold, by adjusting the position of the radiator control valve to a second position. In some examples, the method may further comprise adjusting a position of a radiator bypass valve in response to the temperature of the coolant decreasing below the first threshold, and flowing either all or a portion of the coolant in the cooling system through the radiator bypass and not through the radiator. In still further examples, the method may additionally comprise adjusting the position of the radiator control valve to one or more positions between the first position and the second position and flowing coolant through both the first zone and second zone.

In this way, a cooling system may include an integrated radiator capable of both heating and cooling coolant in the cooling system. The radiator comprises a cooling core consisting of a plurality of hollow tubes for coolant to flow through, and conductive fins for dissipating heat from the coolant in the tubes. The plurality of tubes and fins are divided into two zones of the cooling core, where the two zones may not be fluidly connected to one another, and may further be physically separated from one another. In the second zone, the fins and tubes may be arranged such that air passages are formed therebetween to allow air through the second zone. A radiator fan is configured to blow air through the air passages in the second zone to increase the dissipation and removal of heat from the coolant in the tubes. The fins in the first zone comprise PCM. The fins may be configured to occupy all the space between the tubes in the first zone, such that no air gaps or passages exist between the tubes in the first zone. As such, air my not pass through the first zone of the radiator. The flow of coolant within the radiator may be directed exclusively to either the first zone or the second zone depending on the temperature of the coolant. A coolant control valve in the radiator may be adjusted to regulate the flow of coolant two the two zones of the cooling core. Specifically, the control valve may be adjusted between a first position which restricts coolant flow to only the first zone and not the second zone, and a second position which restricts coolant flow to only the second zone and not the first zone. Further, the position of the control valve may be adjusted between the first position and second position to allow coolant to flow to both the first and second zones.

If the temperature of the coolant is above a first threshold and below a higher second threshold, the second threshold being greater than the first threshold, then the position of the control valve may be adjusted to the second position, and coolant may flow through the second zone.

If the temperature of the coolant is above the higher second threshold, then all of the coolant flowing through the radiator may flow through first zone of the radiator containing the PCM only. As such, the efficiency of the cooling of the coolant may be improved by flowing the coolant through the first zone of the radiator at coolant temperatures above the third threshold. The second threshold may represent excessively high coolant temperatures resulting from peak engine loads such as during hill-climbing, trailer tow modes, etc. Further the second threshold may be greater than the melting temperature of the PCM. Thus, at temperatures above the second threshold, the PCM may cool the coolant more efficiently than would otherwise be achieved by blowing air past the coolant. Flowing coolant through the first zone rather than the second zone when the coolant temperature is greater than the second threshold may be due to the ability of the PCM to absorb heat from the coolant when changing phases from a solid to liquid. Therefore, at coolant temperatures above the second threshold, the coolant may be cooled more efficiently when flowing through the PCM-containing first zone of the radiator than when flowing through the second zone of the radiator. Said another way, at coolant temperatures above the second threshold, more heat may be absorbed from the coolant if it passes through the first zone, than if it passes through the second zone.

In this way, a technical effect of reducing the amount of coolant lost to vaporization is achieved, by providing an improved method for cooling coolant when it reaches temperatures near its boiling point. Thus, by flowing coolant through the first zone of the radiator containing the PCM, the amount of coolant lost to vaporization may be decreased. Further, because the PCM-containing zone may be more efficient in cooling the coolant, than the second zone, the size of the second zone, and therefore, the size of the fan may be reduced. As such, the power consumed by the radiator fan may be decreased. In this way another technical effect of reducing the overall size and reducing fuel consumption of the radiator may be achieved by providing the radiator with an integrated PCM-containing first zone.

Additionally, the latent heat of fusion stored in the PCM when changing from solid to liquid may be returned to the coolant, if the coolant temperature drops below a lower third threshold. Thus, due to engine cold start conditions, or low ambient temperatures, if the coolant temperature drops below the third threshold, then the coolant may be directed to the first zone of the cooling core. As the coolant flows through the first zone of the cooling core, it may absorb heat from the PCM, and the PCM may return to a solid form and release the stored energy upon resolidification.

In this way, another technical effect of increasing fuel efficiency is achieved by increasing the rate at which coolant is warmed to within a desired coolant temperature range. Because the engine may operate more efficiently at a temperature range greater than the temperature of the engine during a cold engine start, increasing the rate at which the engine warms up, may increase the fuel efficiency of the engine. If the temperature of the coolant is below the third threshold, then the coolant may decrease the rate at which the engine warms up and thus decrease engine efficiency. However, by flowing coolant through the first zone of the radiator when the coolant is below the third threshold, the rate at which the coolant is warmed may be increased, and correspondingly, the rate at which the engine warms up may be increased. Thus, using the PCM containing first zone to provide heat to the coolant during an engine cold start and/or cold ambient temperatures may increase the fuel efficiency of the engine.

Finally, the overall efficiency of the cooling system may be improved by the radiator with the integrated PCM-containing first zone. In this way another technical effect of increasing the efficiency of the radiator over a wider range of temperature may be achieved. Because of the radiator's ability to both absorb heat from the coolant, and transfer heat back to the coolant, the precision of the manipulation and regulation of the coolant temperature may be increased. Additionally, the radiator may more efficiently maintain the coolant temperature to within a desired temperature range. Because the radiator more efficiently decreases the coolant temperature from temperatures above the second threshold, and more efficiently increases the coolant temperature from temperatures below the third threshold, the amount of time the coolant temperature is maintained to within the desired temperature range may be increased during engine operation.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
   adjusting a control valve of a radiator of a vehicle cooling system into a first position to flow coolant only through a first zone of the radiator containing phase change material (PCM) and not through a second zone of the radiator not containing PCM; and
   adjusting the control valve into a second position to flow coolant only through the second zone of the radiator and not the first zone.

2. The method of claim 1, further comprising adjusting the control valve into a third position between the first and second positions to flow coolant to both the first zone and second zone of the radiator.

3. The method of claim 1, wherein the control valve is a three-way valve in fluidic communication with the first zone and second zone of the radiator, and a coolant inlet of the radiator, where the coolant inlet is positioned upstream of the first zone and second zone.

4. The method of claim 1, wherein the first and second zones each comprise a plurality of hollow tubes for conducting coolant through the radiator, and wherein flowing coolant through the first zone comprises flowing coolant through one or more of the tubes in only the first zone, and flowing coolant through the second zone comprises flowing coolant through one or more of the tubes in only the second zone.

5. The method of claim 4, wherein one or more heat conductive fins are physically coupled to each of the plurality of tubes.

6. The method of claim 5, wherein the PCM is included within the heat conductive fins of the first zone only.

7. The method of claim 1, wherein the adjusting the control valve into each of the first and second positions is performed via an electronic controller responsive to a temperature of the coolant estimated based on an output from a temperature sensor positioned upstream of the radiator and downstream of an engine.

8. The method of claim 7, wherein adjusting the control valve into the second position is responsive to one or more of a temperature of the coolant increasing above a first threshold and the temperature of the coolant decreasing below a second threshold, the second threshold being greater than the first threshold.

9. The method of claim 8, wherein adjusting the control valve into the first position is responsive to one or more of the temperature of the coolant increasing above the second threshold and the temperature of the coolant decreasing below a third threshold, the third threshold being lower than the first threshold.

10. The method of claim 1, wherein a melting temperature of the PCM is less than a boiling point of the coolant.

11. The method of claim 1, wherein the control valve is a passive wax thermostat valve, wherein a position of the valve is adjusted from the second position to the first position in response to coolant temperature at the control valve increasing above a non-zero threshold.

12. A radiator, comprising:
   a first set of coolant tubes, each tube of the first set encased with a phase change material (PCM);
   a second set of coolant tubes, each tube of the second set not encased with the PCM; and
   a valve disposed within an inlet tank of the radiator and in fluid communication with a coolant inlet of the radiator, the valve fluidly separating the first and second sets of coolant tubes, the radiator part of a vehicle cooling system.

13. The radiator of claim 12, wherein the valve divides the inlet tank into a first portion in fluid communication with tube inlets of the first set of coolant tubes and a second portion in fluid communication with tube inlets of the second set of coolant tubes.

14. The radiator of claim 12, wherein the valve is adjustable between a first position communicating coolant from the coolant inlet to only the first set of coolant tubes and a second position communicating coolant from the coolant inlet to only the second set of coolant tubes.

15. The radiator of claim 12, wherein the second set of coolant tubes further comprises a plurality of heat conductive fins coupled to exterior surfaces of one or more adjacent coolant tubes of the second set of coolant tubes, where the fins are spaced away from one another to form air passages through which air flows perpendicularly to a flow of coolant in the radiator.

16. The radiator of claim 12, wherein the valve is a passive thermostatic valve comprising a temperature sensitive element and wherein a position of the valve is adjusted in response to changes in coolant temperature at the valve.

17. The radiator of claim 12, wherein the PCM extends fully between exterior surfaces of adjacent coolant tubes of the first set of coolant tubes and the PCM physically couples all coolant tubes of the first set of coolant tubes to one another.

18. A cooling system comprising:
   an engine;
   a pump for circulating coolant in the cooling system;
   a radiator comprising two zones, a first zone containing a phase change material (PCM) and a second zone not containing PCM, the radiator further comprising a radiator control valve for selectively controlling coolant flow to each of the first and second zones; and a controller with computer readable instructions for:
adjusting a position of the radiator control valve to a first position and flowing coolant only to the first zone and not the second zone, in response to one or more of a temperature of the coolant increasing above a first threshold and decreasing below a second threshold, the second threshold being less than the first threshold; and adjusting the position of the radiator control valve to a second position and flowing coolant only to the second zone and not the first zone, in response to one or more of the temperature of the coolant increasing above a third threshold, the third threshold being greater than the second threshold but less than the first threshold, and decreasing below the first threshold.

19. The cooling system of claim 18, wherein the computer readable instructions further include instructions for adjusting a position of a temperature control valve to a first position and flowing coolant through a radiator bypass in response to the temperature of the coolant decreasing below the first threshold.

20. The cooling system of claim 18, wherein the radiator further comprises a coolant inlet in fluidic communication with the cooling system and the radiator for flowing coolant from outside the radiator into an inlet tank of the radiator, the inlet tank being in fluidic communication with the first zone and second zone and wherein the radiator control valve is positioned in the inlet tank of the radiator and is in fluidic communication with the coolant inlet, first zone, and second zone.

* * * * *